(12) United States Patent
Koyama

(10) Patent No.: US 10,229,327 B2
(45) Date of Patent: Mar. 12, 2019

(54) ANALYSIS CONTROL SYSTEM

(71) Applicant: NEC Corporation, Minato-ku, Tokyo (JP)

(72) Inventor: Kazuya Koyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/648,936

(22) PCT Filed: Nov. 6, 2013

(86) PCT No.: PCT/JP2013/006533
§ 371 (c)(1),
(2) Date: Jun. 2, 2015

(87) PCT Pub. No.: WO2014/091667
PCT Pub. Date: Jun. 19, 2014

(65) Prior Publication Data
US 2015/0317521 A1    Nov. 5, 2015

(30) Foreign Application Priority Data
Dec. 10, 2012  (JP) ................................ 2012-269141

(51) Int. Cl.
*G06K 9/00*           (2006.01)
(52) U.S. Cl.
CPC ................................ *G06K 9/00771* (2013.01)
(58) Field of Classification Search
CPC .................................................. G06K 9/00771
See application file for complete search history.

(56) References Cited

U.S. PATENT DOCUMENTS

| | | | | |
|---|---|---|---|---|
| 8,199,208 | B2 * | 6/2012 | Katsumata | G06K 9/00315 340/5.53 |
| 9,767,347 | B2 * | 9/2017 | Shiraishi | G06K 9/00228 |
| 2001/0019357 | A1 * | 9/2001 | Ito | G08B 13/19604 348/152 |
| 2004/0164858 | A1 * | 8/2004 | Lin | G08B 13/19608 340/522 |
| 2005/0128293 | A1 * | 6/2005 | Wilsey | G06K 7/10079 348/143 |
| 2007/0182818 | A1 * | 8/2007 | Buehler | G08B 13/19602 348/143 |

(Continued)

FOREIGN PATENT DOCUMENTS

| | | | |
|---|---|---|---|
| JP | 2004535616 A | 11/2004 | |
| JP | 2005534205 A | 11/2005 | |

(Continued)

*Primary Examiner* — Mia M Thomas

(57) ABSTRACT

An analysis control system 100 of the present invention includes: an engine control unit 103 controlling analysis processing operation of a plurality of analysis engines 110 each executing analysis processing on analysis target data; an analysis processing condition acceptance unit 101 accepting input of an analysis processing condition relating to the analysis target data; and a priority setting unit 102 setting a priority of the analysis engine executing the analysis processing on the analysis target data, on a basis of the analysis processing condition. The engine control unit 103 controls the analysis processing operation of the analysis engines in accordance with the priority set by the priority setting unit.

7 Claims, 11 Drawing Sheets

(56) References Cited

U.S. PATENT DOCUMENTS

| | | | | |
|---|---|---|---|---|
| 2008/0028031 A1* | 1/2008 | Bailey | | G06Q 10/10 709/207 |
| 2008/0208363 A1* | 8/2008 | Grgic | | G05B 19/042 700/2 |
| 2008/0284867 A1* | 11/2008 | Ishihara | | H04N 5/23219 348/222.1 |
| 2009/0009652 A1* | 1/2009 | Sudo | | H04N 5/772 348/349 |
| 2009/0099880 A1* | 4/2009 | Doyle | | G06Q 10/0633 705/7.27 |
| 2009/0324020 A1* | 12/2009 | Hasebe | | G06K 9/00228 382/115 |
| 2010/0007763 A1* | 1/2010 | Yokohata | | H04N 5/23212 348/222.1 |
| 2010/0097470 A1* | 4/2010 | Yoshida | | G08B 13/19641 348/159 |
| 2010/0150450 A1* | 6/2010 | Tsuji | | H04N 5/232 382/195 |
| 2010/0241261 A1* | 9/2010 | Taguchi | | G03F 1/36 700/98 |
| 2010/0245563 A1* | 9/2010 | Golovchinsky | | H04N 7/18 348/135 |
| 2010/0328055 A1* | 12/2010 | Fong | | B60Q 9/005 340/425.5 |
| 2011/0013837 A1* | 1/2011 | Bergman | | G06T 7/0081 382/173 |
| 2011/0317928 A1* | 12/2011 | Yabu | | G06F 17/30247 382/225 |
| 2012/0137302 A1* | 5/2012 | Tsuchida | | G06F 9/4881 718/103 |
| 2012/0155707 A1* | 6/2012 | Kawano | | G06K 9/00342 382/103 |
| 2013/0050502 A1* | 2/2013 | Saito | | G06T 7/20 348/169 |
| 2013/0290336 A1* | 10/2013 | Moriguchi | | G06T 7/2006 707/737 |
| 2013/0343604 A1* | 12/2013 | Adachi | | G06K 9/00711 382/103 |
| 2015/0116488 A1* | 4/2015 | Shishalov | | G08B 17/125 348/143 |
| 2015/0356840 A1* | 12/2015 | Wang | | G08B 13/19682 382/103 |
| 2015/0371078 A1* | 12/2015 | Shiraishi | | G06K 9/00228 382/103 |
| 2016/0094793 A1* | 3/2016 | Westmacott | | H04N 5/23296 348/159 |

FOREIGN PATENT DOCUMENTS

| | | |
|---|---|---|
| JP | 2008011457 A | 1/2008 |
| JP | 2010204892 A | 9/2010 |
| WO | 2012098853 A1 | 7/2012 |

* cited by examiner

| PLACE | TIME | ANALYSIS TARGET | MATCHING TARGET |
|---|---|---|---|
| PLATFORM 1 OF A STATION | 10:00 | CLOTHES | BROWN COAT |

(B)

| CAMERA NAME | SET-UP PLACE | ANGLE OF VIEW |
|---|---|---|
| CAMERA A | PLATFORM 1 OF A STATION | WIDE ANGLE |
| CAMERA B | TICKET GATE OF B STATION | CLOSEUP OF FACE |

(C)

| ANALYSIS CONTENT | ANGLE-OF-VIEW CONDITION |
|---|---|
| FACE ANALYSIS | CLOSEUP OF FACE |
| CLOTHES ANALYSIS | WIDE ANGLE |
| BEHAVIOR DETECTION | WIDE ANGLE, ULTRA-WIDE ANGLE |

| CAMERA NAME | ANALYSIS CONTENT | PRIORITY |
|---|---|---|
| CAMERA A | FACE ANALYSIS | LOW |
| CAMERA A | CLOTHES ANALYSIS | HIGH |
| CAMERA A | BEHAVIOR DETECTION | LOW |
| CAMERA B | FACE ANALYSIS | LOW |

(B)

| MATCHING DATA | PRIORITY |
|---|---|
| FACE 1 | LOW |
| FACE 2 | LOW |
| FACE 3 | LOW |

(C)

| MATCHING DATA | PRIORITY |
|---|---|
| CLOTHES 1 | LOW |
| CLOTHES 2 (BROWN COAT) | HIGH |
| CLOTHES 3 | LOW |

| CAMERA NAME | ANALYSIS CONTENT | PRIORITY |
|---|---|---|
| CAMERA A | ACE ANALYSIS | LOW |
| CAMERA A | CLOTHES ANALYSIS | MIDDLE |
| CAMERA A | BEHAVIOR DETECTION | LOW |
| CAMERA B | ACE ANALYSIS | HIGH |

(B)

| MATCHING DATA | PRIORITY |
|---|---|
| FACE 1 | HIGH |
| FACE 2 | LOW |
| FACE 3 | LOW |

(C)

| MATCHING DATA | PRIORITY |
|---|---|
| CLOTHES 1 | LOW |
| CLOTHES 2 | HIGH |
| CLOTHES 3 | LOW |

ANALYSIS CONTROL SYSTEM

This application is a National Stage Entry of PCT/JP2013/006533 filed on Nov. 6, 2013, which claims priority from Japanese Patent Application 2012-269141 filed on Dec. 10, 2012, the contents of all of which are incorporated herein by reference, in their entirety.

TECHNICAL FIELD

The present invention relates to an analysis control system. In particular, the present invention relates to an analysis control system controlling the analysis operation of an analysis engine executing analysis processing on analysis target data.

BACKGROUND ART

In recent years, with the progress of information processing technologies, analysis engines which analyze various data have been developed. Various analysis engines have been developed: for example, an analysis engine which extracts a person wearing specific clothes from moving image data, an analysis engine which extracts a person with a specific face from moving image data, an analysis engine which generates location information that traces the flow line of a person from moving image data, and an analysis engine which generates text data from voice data.

Moreover, analysis systems which can acquire various analysis processing results from input data have also been developed by combining a plurality of analysis engines of the same type or different types. For example, a developed system executes analysis processing that is processing moving image data inputted from a camera in parallel or in series with a flow line extraction engine, a face extraction engine, an age discrimination engine and so on and judging a person who behaves in a given manner. Such an analysis system that judges a person from moving image data captured by a camera is required to acquire an analysis processing result quickly without delay, preferably, in real time.

Patent Document 1: Japanese Unexamined Patent Application Publication (Translation of PCT Application) No. 2004-535616

However, in a case where analysis target data is data which is consecutively inputted and is comparatively large-volume, such as moving image data or voice data, the load of the analysis processing executed by the analysis engines is high, and it is difficult to quickly acquire the result of the analysis processing. On the contrary, in a case where the volume of analysis target data is made to be small in advance by, for example, setting the frame rate of moving image data low, there is a problem that an analysis result with desired analysis accuracy cannot be acquired.

Patent Document 1 discloses a technique that is changing pixels to be analyzed in accordance with the intrusion status of a target object into a range monitored by the camera. This technique is beneficial in a case where a desired analysis result can be acquired even if a region to be subjected to analysis processing is limited. However, this technique cannot work in other cases. Therefore, there is a problem that a desired analysis result cannot be acquired quickly.

SUMMARY

Accordingly, an object of the present invention is to provide an analysis control system which can solve the problem that a desired analysis result cannot be acquired quickly from analysis target data.

An aspect of the present invention provides an analysis control system including:
an engine control unit controlling analysis processing operation of a plurality of analysis engines each executing analysis processing on analysis target data;
an analysis processing condition acceptance unit accepting input of an analysis processing condition relating to the analysis target data; and
a priority setting unit setting a priority of the analysis engine executing the analysis processing on the analysis target data, on a basis of the analysis processing condition.
The engine control unit controls the analysis processing operation of the analysis engines in accordance with the priority set by the priority setting unit.

Further, another aspect of the present invention provides an information processing device including:
an analysis processing condition acceptance unit accepting input of an analysis processing condition relating to analysis target data of analysis by an analysis engine;
a priority determination unit determining a priority of the analysis engine executing analysis processing on the analysis target data, on a basis of the analysis processing condition; and
a priority setting unit setting the priority in an analysis processing device so that an engine control unit controls analysis processing operation of a plurality of analysis engines in accordance with the priority, the analysis processing device including the engine control unit controlling the analysis processing operation of the analysis engines.

Further, another aspect of the present invention provides a computer program including instructions for causing an information device to realize:
an analysis processing condition acceptance unit accepting input of an analysis processing condition relating to analysis target data of analysis by an analysis engine;
a priority determination unit determining a priority of the analysis engine executing analysis processing on the analysis target data, on a basis of the analysis processing condition; and
a priority setting unit setting the priority in an analysis processing device so that an engine control unit controls analysis processing operation of a plurality of analysis engines in accordance with the priority, the analysis processing device including the engine control unit controlling the analysis processing operation of the analysis engines.

Further, another aspect of the present invention provides an analysis control method including:
accepting input of an analysis processing condition relating to analysis target data of analysis by an analysis engine;
setting a priority of the analysis engine executing analysis processing on the analysis target data, on a basis of the analysis processing condition; and
controlling analysis processing operation of a plurality of analysis engines in accordance with the priority.

With the configurations as described above, the present invention can provide an analysis control system which can quickly acquire a desired analysis result from analysis target data.

BRIEF DESCRIPTION OF DRAWINGS

FIGS. 4A to 4C are views showing an example of data stored in the analysis condition setting device disclosed in FIG. 2;

FIGS. 5A to 5C are views showing an example of data stored in the video analysis device disclosed in FIG. 3;

FIGS. 9A to 9C are views showing an example of data stored in a video analysis device in the second exemplary embodiment of the present invention;

EXEMPLARY EMBODIMENTS

Figure 1:
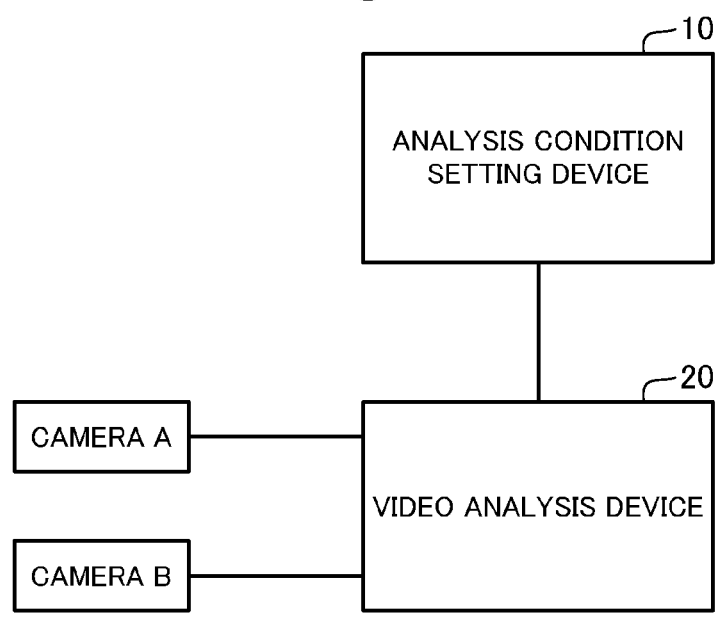
FIG. 1 is a block diagram showing the overview of the configuration of an analysis system in the present invention.

An analysis system in the present invention includes, as shown in FIG. 1, a video analysis device 20 including a plurality of analysis engines executing analysis processing on video data that is analysis target data, and an analysis condition setting device 10 setting the priorities of the analysis engines. The following exemplary embodiments will describe as an example a case where analysis target data is video data, but analysis target data is not limited to video data necessarily. For example, analysis target data may be other data that are consecutively inputted, such as voice data.

First Exemplary Embodiment

Figure 6:
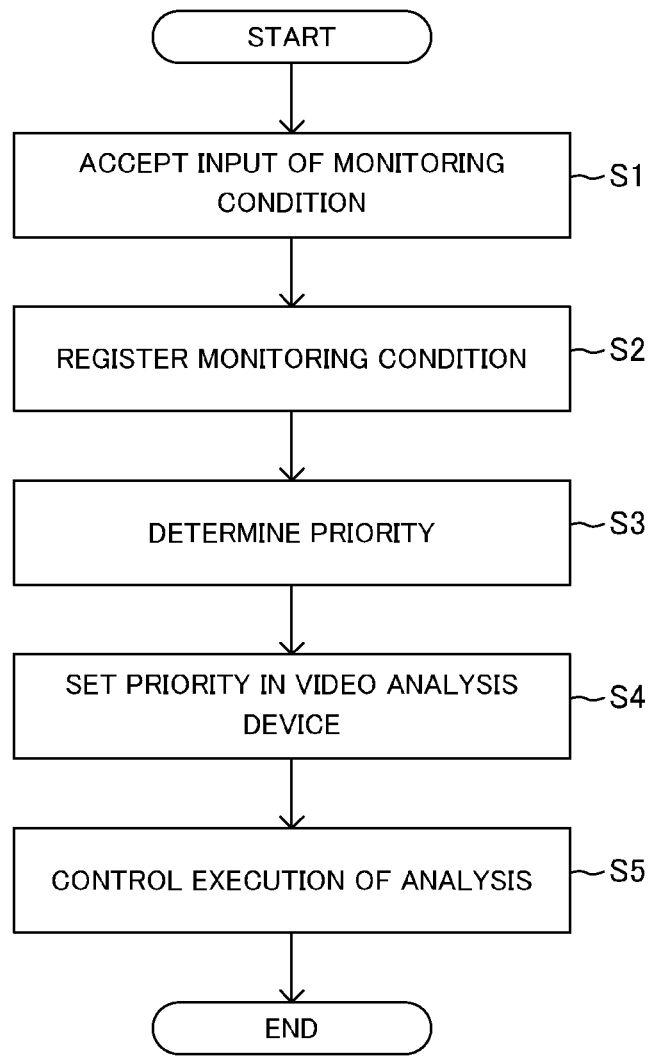
FIG. 6 is a flowchart showing the operation of the analysis system in the first exemplary embodiment of the present invention.
Figure 7:
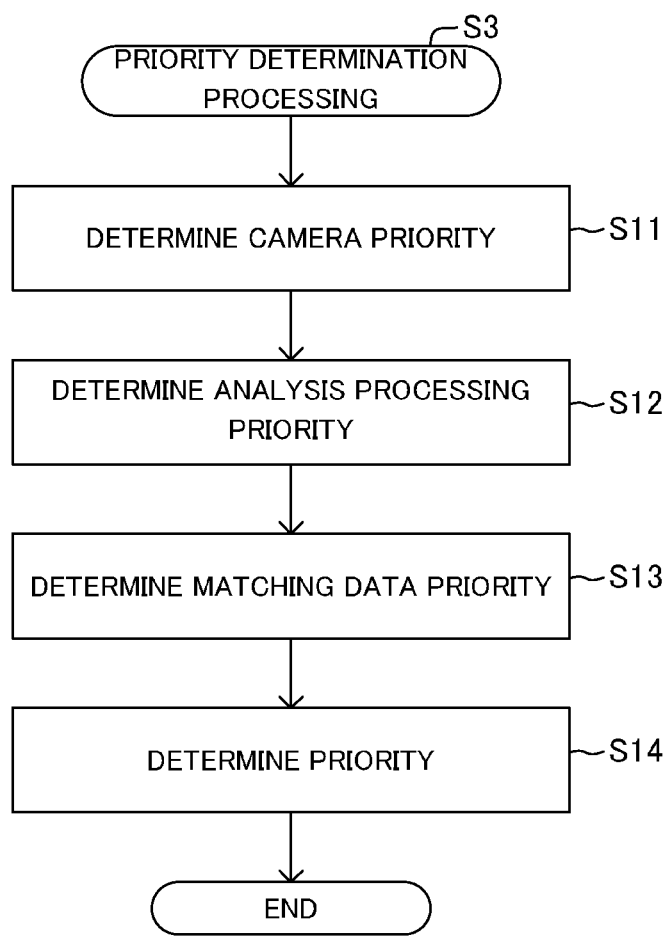
FIG. 7 is a flowchart showing the operation of the analysis system in the first exemplary embodiment of the present invention.

A first exemplary embodiment of the present invention will be described referring to FIGS. 1 to 7. FIGS. 1 to 5C are views for describing the configuration of an analysis system in this exemplary embodiment. FIGS. 6 and 7 are views for describing the operation of the analysis system.

As shown in FIG. 1, the analysis system in this exemplary embodiment includes the analysis condition setting device 10 and the video analysis device 20. However, the analysis system does not need to be configured by two information processing devices such as the analysis condition setting device 10 and the video analysis device 20 necessarily. The analysis system may be configured by one information processing device, or configured by three or more information processing devices.

The video analysis device 20 has a function of accepting analysis target data which are consecutively inputted thereinto and sequentially executing analysis processing on the analysis target data. In particular, the video analysis device 20 in this exemplary embodiment executes analysis processing that is acquiring video data in a certain place and monitoring the place shown in the video data. Therefore, the video analysis device 20 is connected with cameras A and B (data acquisition devices) which acquire video data that is analysis target data, and loads video data captured by the respective cameras A and B. In this exemplary embodiment, the camera A is set up on "Platform 1 of A station," and serves as a camera for shooting a wide range on this platform. The camera B is set up at "Ticket Gate of B station" connected with A station by a given line, and serves as a camera for taking a close-up shot of the face of a person passing through the ticket gate.

The video analysis device 20 includes analysis units 21 and 22 which execute analysis processing on video data captured by the cameras A and B, respectively (the camera A's analysis unit 21 and the camera B's analysis unit 22). The analysis units 21 and 22 each include a plurality of analysis engines for executing a variety of analysis processing on video data. For example, the camera A's analysis unit 21 includes a face analysis unit 31 (an analysis engine) which executes, on video data, face matching with face data previously registered in a face BL management unit 32. Moreover, the camera A's analysis unit 21 includes a clothes analysis unit 33 (an analysis engine) which executes, on video data, clothes matching with clothes data previously registered in a clothes BL management unit 34. Furthermore, the camera A's analysis unit 21 includes a behavior analysis unit 35 (an analysis engine) which executes tracking of the flow line of a person on video data. Likewise, the camera B's analysis unit 22 includes a face analysis unit 41 and a face BL management unit 42, a clothes analysis unit 43 and a clothes BL management unit 44, and a behavior analysis unit 45, which are for executing a variety of analysis processing on video data captured by the camera B.

Further, the video analysis device 20 includes an analysis priority management unit 23 and an analysis execution control unit 24. The analysis priority management unit 23 has a function of setting various orders of priority determined by the analysis condition setting device 10 as described later. For example, the analysis priority management unit 23 sets the order of priority of the analysis engines, the order of priority of the video data, and the order of priority of the matching data. The order of priority of the analysis engines is execution of analysis processing by what analysis engine takes priority. The priority order of video data is analysis processing on video data acquired by what camera takes priority. The priority degree of matching data is what matching data takes priority as a matching target when the analysis engines execute matching.

The analysis execution control unit 24 (an engine control unit) controls the analysis processing executed by the respective analysis engines in accordance with the set order of priority. The analysis execution control unit 24 places a higher priority on execution of analysis processing with a higher priority set on video data acquired by a camera with a higher priority set than execution of analysis processing by the other analysis engines on the other video data. Further, in the analysis processing by the analysis engines, the analysis execution control unit 24 places a higher priority on execution of matching processing with matching data with a higher priority set than execution of matching processing with the other matching data. The analysis execution control unit 24 controls so that at least analysis processing by an analysis engine with a high priority set is executed, and does not need to control necessarily so that analysis processing by an analysis engine with a low priority set is executed.

The camera A's analysis unit 21, the camera B's analysis unit 22, the analysis priority management unit 23, and the analysis execution control unit 24 that are included by the video analysis device 20 are realized by installation of a program into an arithmetic device included in the video analysis device 20.

Figure 2:
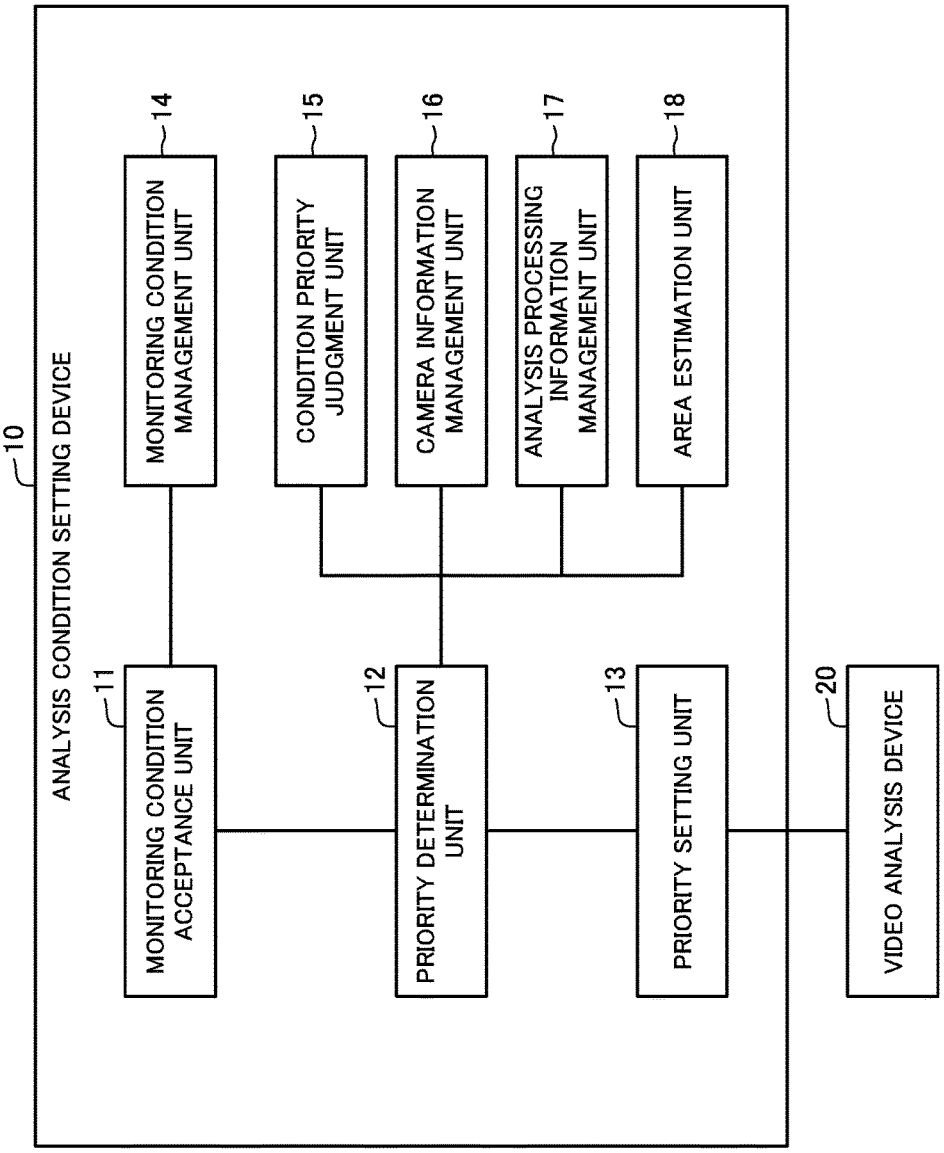
FIG. 2 is a block diagram showing the configuration of an analysis condition setting device configuring an analysis system in a first exemplary embodiment of the present invention.
Figure 3:
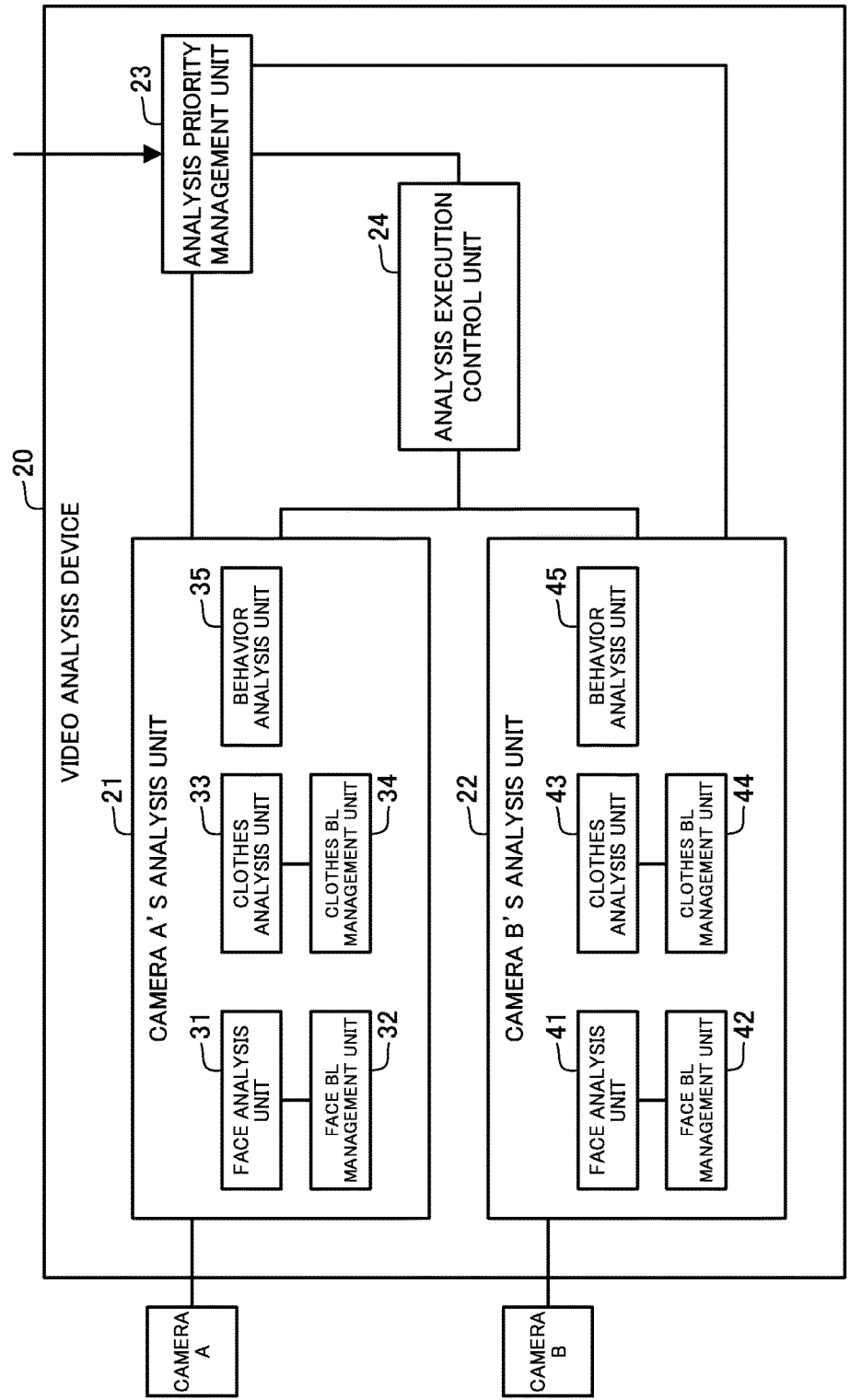
FIG. 3 is a block diagram showing the configuration of a video analysis device configuring the analysis system in the first exemplary embodiment of the present invention.

Next, the analysis condition setting device 10 will be described. As shown in FIG. 2, the analysis condition setting device 10 includes a monitoring condition acceptance unit 11, a priority determination unit 12, a priority setting unit 13, a monitoring condition management unit 14, a condition priority judgment unit 15, a camera information management unit 16, an analysis processing information management unit 17, and an area estimation unit 18. The respective units 11 to 18 are realized by installation of a program into an arithmetic device included in the analysis condition setting device 10.

The monitoring condition acceptance unit 11 (an analysis processing condition acceptance unit) accepts input of a condition for analysis processing on analysis target data, and causes the monitoring condition management unit 14 to store and manage the condition in a storage device. In this exemplary embodiment, the monitoring condition acceptance unit 11 accepts an analysis processing condition inputted by the user through a keyboard or the like. An analysis processing condition is a condition under which an analysis engine outputs an analysis result from analysis target data. For example, in a case where an analysis processing condition is information of "Red Clothes," the analysis engine serving as the clothes analysis unit 33 examines whether or not video data contains "Object in Red Clothes" and, when the video data includes, outputs data of the detected "Object in Red Clothes" as an analysis result. Meanwhile, an analysis processing condition accepted by the monitoring condition acceptance unit 11 may be inputted by any method. For example, as described in a second exemplary embodiment later, the monitoring condition acceptance unit 11 may accept, as a new analysis processing condition, an analysis result outputted in analysis processing executed by an analysis engine taking priority.

The priority determination unit 12 determines the various orders of priority described above on the basis of an analysis processing condition accepted by the monitoring condition acceptance unit 11. For example, in a case where the analysis processing condition is information of "Red Clothes" as described above, it is necessary to use video data and an analysis engine which enable acquisition of an analysis result relating to "Clothes" in analysis processing. Therefore, the priority determination unit 12 places a high priority on a camera which captures video data with an angle of view where clothes are shown, and also places a high priority on an analysis engine which executes clothes analysis processing. Information of each camera is stored in the camera information management unit 16 and a condition of video data necessary for each analysis processing is stored in the analysis processing information management unit 17 in advance. For example, in the camera information management unit 16, as shown in FIG. 4B, information including the name of a camera, the set-up place of the camera and the angle of view of video data captured by the camera is stored. Moreover, in the analysis processing information management unit 17, as shown in FIG. 4C, information including the content of analysis and an angle-of-view condition of video data is stored. Then, by using such information, the condition priority judgment unit 15 judges the priorities of the cameras and the priorities of the analysis engines as described above in accordance with the analysis processing condition.

In a case where the analysis processing condition contains information about "Place" and "Time," the area estimation unit 18 estimates the place of a camera capturing video data to be analyzed from the information about place and time, and places a high priority on the camera.

Further, the priority determination unit 12 determines the order of priority of the matching data which become matching targets used in execution of the matching processing by the analysis engine. For example, in a case where the analysis processing condition is "Red Clothes," the priority determination unit 12 determines to place a high priority on matching data of "Red Clothes."

The priority setting unit 13 transmits the orders of priority determined in the abovementioned manner to the video analysis device 20 and sets them therein. An example of a case where the orders of priority are set in the video analysis device 20 is shown by FIGS. 5A to 5C, and the details of the information will be described later.

Next, by using a specific example, the operation of the abovementioned analysis system will be described referring to flowcharts shown in FIGS. 6 and 7.

First, it is assumed as a situation that an incident occurred on Platform 1 of A station, the criminal escaped and it is known from eyewitness testimony that the criminal was wearing a brown coat. Under such a situation, execution of analysis processing that is extracting a video image of the criminal from a video captured by the monitoring camera will be simulated.

It is assumed that in the abovementioned situation, place information of "Platform 1 of A station," time information of "10:00," analysis target information of "Clothes" and matching target information of "Brown Coat" are inputted as the analysis processing condition by the operator. Then, the monitoring condition acceptance unit 11 of the analysis condition setting device 10 accepts the information of the analysis processing condition inputted thereinto, registers the information of the analysis processing condition into the storage device as shown in FIG. 4A, and causes the monitoring condition management unit 14 to store and manage the information (steps S1 and S2 in FIG. 6).

Subsequently, the priority determination unit 12 of the analysis condition setting device 10 determines various orders of priority on the basis of the registered analysis processing condition (step S3 in FIG. 6). Herein, the details of priority determination processing will be described referring to the flowchart shown in FIG. 7.

First, the priority determination unit 12 determines the priorities of the cameras (step S11 in FIG. 7). The priorities of the cameras are determined for the analysis processing condition in accordance with the set-up positions of the cameras and the angles of view of video data captured by the cameras. Herein, because the analysis processing condition contains the place "Platform 1 of A station" and time "10:00," the priority determination unit 12 should place a priority on a camera set up in a range where the criminal could have moved from the place "Platform 1 of A station" during a period from the incident occurrence time to the current time. Therefore, regarding the positions of the cameras, the priority determination unit 12 determines that both the camera A and the camera B take priority. However, the analysis processing condition contains the analysis target "Clothes," the priority determination unit 12 needs to give priority to a camera capable of capturing video data with an angle of view where clothes are shown. Therefore, on the basis of the information managed by the camera information management unit 16 shown in FIG. 4B and the information managed by the analysis processing information management unit 17 shown in FIG. 4C, the priority determination unit 12 determines to give priority to the camera A that captures video data with a wide angle of view which is necessary for clothes analysis.

Subsequently, the priority determination unit 12 determines the priorities of the analysis engines (step S12 in FIG. 7). The priorities of the analysis engines are determined for the analysis processing condition in accordance with the contents of analysis by the analysis engines. Herein, because the analysis processing condition contains the analysis target "Clothes," the priority determination unit 12 should give priority to the clothes analysis units 33 and 43 serving as analysis engines whose analysis targets are clothes. Therefore, regarding the analysis engines, the priority determination unit 12 determines that the clothes analysis units 33 and 43 take priority. Moreover, the priority determination unit 12 determines the priorities combined with the priorities of the cameras mentioned above. In other words, the priority determination unit 12 determines that analysis processing executed by the clothes analysis unit 33 on video data captured by the camera A takes priority. Conversely, the priority determination unit 12 determines that other analysis processing on video data captured by the camera B serving as the other camera is given low priority.

Subsequently, the priority determination unit 12 determines the priorities of the matching data in the respective analysis processing (step S13 in FIG. 7). Herein, because the analysis processing condition contains the matching target "Brown Coat," the priority determination unit 12 should place a priority on matching processing with the matching data "Brown Coat." Therefore, regarding the matching data, the priority determination unit 12 determines that "Brown Coat" takes priority.

Subsequently, the priority determination unit 12 determines the priorities of processing which have not been determined to take priority in the abovementioned priority determination processing (step S14 in FIG. 7). For example, the priority determination unit 12 determines above that the priority of analysis processing by the clothes analysis unit 33 on video data captured by the camera A is the highest (HIGH), but the priority determination unit 12 may determine that the priority of analysis processing by the clothes analysis unit 43 on video data captured by the camera B serving as the other camera is the second highest (MIDDLE). Also, the priority determination unit 12 may determine the priorities so that analysis processing by each of the other analysis engines is executed with the minimum analysis accuracy kept. Consequently, even if a person who meets an analysis processing condition is missed in analysis processing executed by an analysis engine with the highest priority set, it is possible to leave the possibility that the person can be detected in other analysis processing.

After determination of the priorities in the above manner, the priority setting part 13 of the analysis condition setting device 10 sets the determined priorities in the video analysis device 20 (step S4 in FIG. 6). To be specific, firstly, as shown in FIG. 5A, priority information that a high priority is placed on analysis processing by the clothes analysis unit 33 on video data captured by the camera A (HIGH) is set in the analysis priority management unit 23. Moreover, as the priority of matching data to be matched in execution of matching processing by the clothes analysis unit 33, priority information that a high priority is placed on matching data "Clothes 2" whose content is "Brown Coat" (HIGH) is set in the clothes BL management unit 34 as shown in FIG. 5C. Meanwhile, priority information of face matching data shown in FIG. 5B is set in the face BL management unit though it is not used in this exemplary embodiment.

Subsequently, the analysis execution control unit 24 of the video analysis device 20 controls the analysis processing operation on the basis of a variety of priority information set as described above. In this case, firstly, the analysis execution control unit 24 controls to execute analysis processing by the clothes analysis unit 33 of the camera A's analysis unit 21, that is, clothes analysis processing on video data captured by the camera A prior to other analysis processing. In other words, the analysis execution control unit 24 controls so that analysis processing by the clothes analysis unit 33 using the hardware resources of the video analysis device 20 is executed before other analysis processing (face analysis processing and so on) on the same video data captured by the camera A and analysis processing on video data captured by the camera B are executed.

To be specific, the video analysis device 20 executes analysis processing in accordance with the priorities in the following manner. Firstly, for the respective frame images of consecutively inputted video data, the video analysis device 20 enqueues execution of each analysis processing on each of the images as one task. Then, when sequentially executing enqueued tasks, the video analysis device 20 first executes tasks having high priority. Otherwise, by first discarding tasks having low priority in a case where the queue size exceeds a preset value while tasks are enqueued and thereby enqueuing only tasks having high priority, the video analysis device 20 may preferentially execute the tasks having high priority.

Further, the clothes analysis unit 33 preferentially executes matching processing with the matching data "Clothes 2" representing "Brown Coat" at the time of analysis processing. Then, the clothes analysis unit 33 executes clothes matching processing on consecutively inputted video data. In a case where the hardware resources of the video analysis device 20 are left over while the clothes matching processing is being executed, the video analysis device 20 executes other analysis processing having low priority in parallel, and executes matching processing with other matching data. However, processing with the priority set low does not need to be executed necessarily, and may be discarded.

Thus, because the analysis system in this exemplary embodiment executes analysis processing having the potential to satisfy an inputted analysis processing condition prior to other processing, it is possible to quickly acquire a desired analysis processing result. Consequently, it is possible to provide a higher-performance analysis system while limiting hardware resources. For example, in the example described above, a person in "Brown Coat" can be quickly extracted from video data, so that it is possible to chase and catch a criminal in an early time.

Second Exemplary Embodiment

Figure 8:
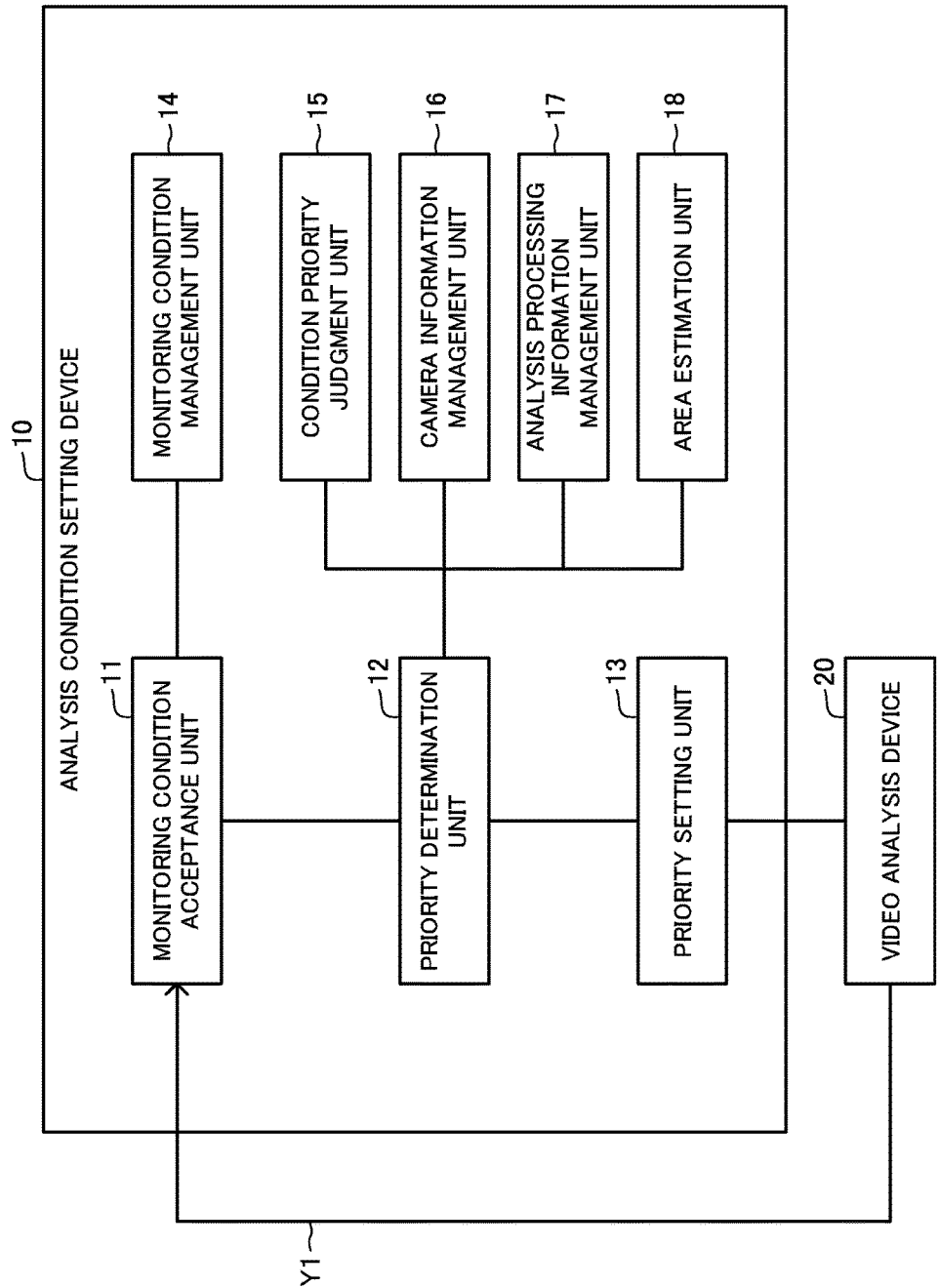
FIG. 8 is a block diagram showing the configuration of an analysis condition setting device configuring an analysis system in a second exemplary embodiment of the present invention.
Figure 10:
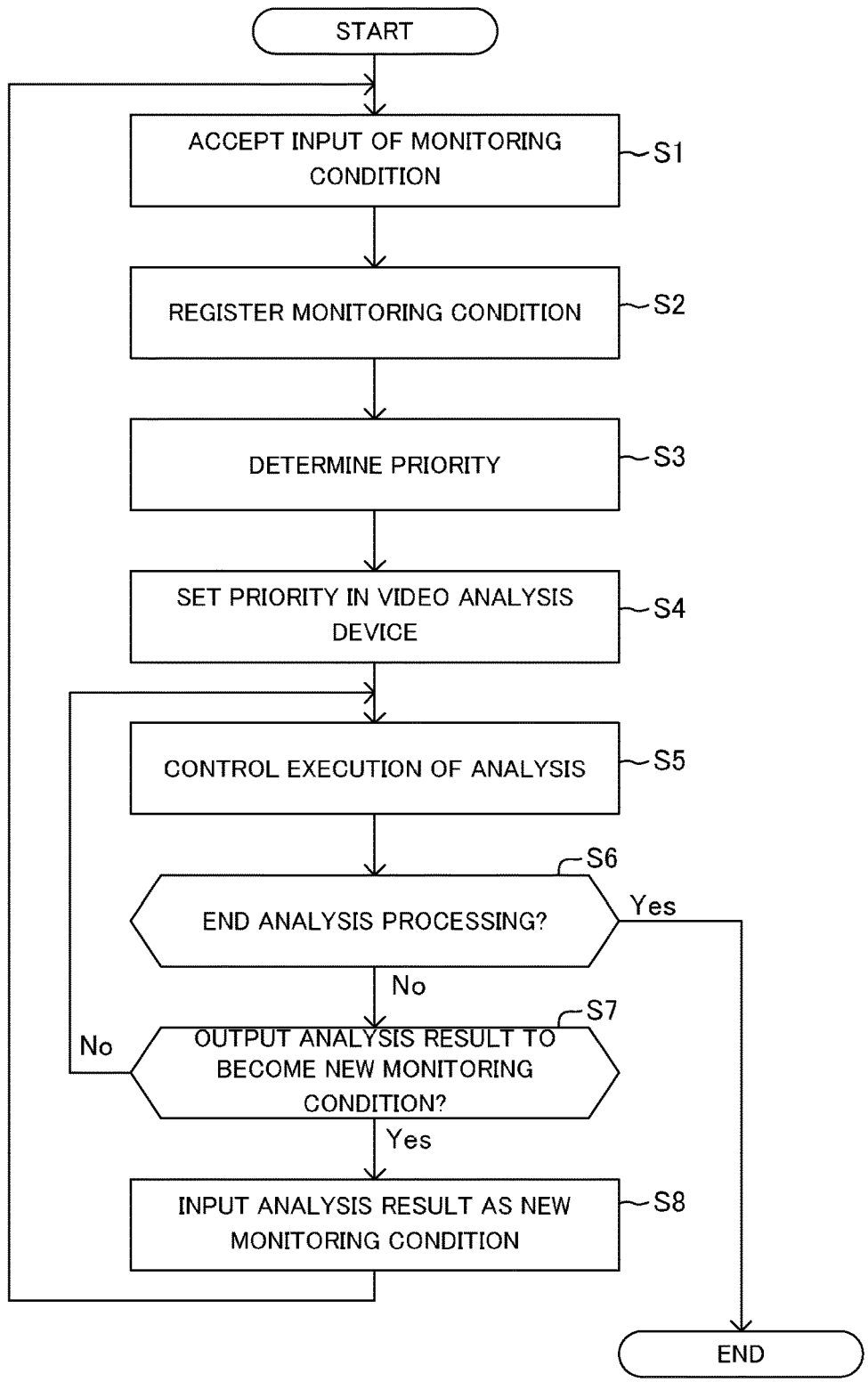
FIG. 10 is a flowchart showing the operation of the analysis system in the second exemplary embodiment of the present invention.

Next, a second exemplary embodiment of the present invention will be described referring to FIGS. 8 to 10. FIG. 8 to FIG. 9C are views for describing the configuration of an analysis system in this exemplary embodiment, and FIG. 10 is a view for describing the operation of the analysis system.

The analysis system in this exemplary embodiment has almost the same configuration as the configuration described in the first exemplary embodiment. Therefore, only a different point from the first exemplary embodiment will be described below.

The monitoring condition acceptance unit 11 included by the analysis condition setting device 10 in the first exemplary embodiment described above accepts an analysis processing condition manually inputted by the user, but the monitoring condition acceptance unit 11 in this exemplary embodiment is configured to accept an analysis processing condition inputted by the video analysis device 20 as shown with arrow Y1 in FIG. 8. Therefore, the video analysis device 20 has a function of inputting information generated in analysis processing executed by an analysis engine as a new analysis processing condition into the analysis condition setting device 10.

To be specific, assuming the following situation, the operation of the analysis system in this exemplary embodiment will be described. As in the first exemplary embodiment, it is assumed as a situation that an incident occurred on Platform 1 of A station, the criminal escaped and it is known from eyewitness testimony that the criminal was wearing a brown coat. Under such a situation, it is simulated that, in a case where a photograph of the face of the person in "Brown Coat" is successfully extracted in the analysis processing in the first exemplary embodiment, analysis processing that is extracting the criminal with that face from video data is executed.

First, the operator inputs place information of "Platform 1 of A station," time information of "10:00," analysis target information of "Clothes" and matching target information of "Brown Coat," as a first analysis processing condition. With this, the operator inputs an instruction to acquire "Face Image" of the person in "Brown Coat" in analysis processing corresponding to the analysis processing condition, and an instruction to, in the case of successfully acquiring "Face Image, input analysis target information of "Face" and matching target information for the acquired "Face Image," as a second analysis processing condition (a new analysis processing condition).

Subsequently, as described in the first exemplary embodiment, the analysis condition setting device 10 and the video analysis device 20 specify a video image of the person in "Brown Coat" in accordance with the first analysis processing condition (steps S1 to S5 in FIG. 10), and extracts "Face Image" of the person from the video image (in FIG. 10, step S6: No, step S7: Yes). Then, the video analysis device 20 inputs the extracted "Face Image" as a new analysis processing condition into the analysis condition setting device 10 (step S8 in FIG. 10). Consequently, the analysis condition setting device 10 accepts and registers the second analysis processing condition including the analysis target information of "Face" and the matching target information for the acquired "Face Image" as a new analysis processing condition (steps S1 and S2 in FIG. 10).

After that, the analysis condition setting device 10 sets the priorities as in the first exemplary embodiment on the basis of the new analysis processing condition (steps S3 and S4 in FIG. 10). In this setting, the analysis condition setting device 10 determines new priorities by adding the priorities based on the new analysis processing condition to the priorities based on the first analysis condition and, at the same time, placing a higher priority on the priorities based on the new analysis processing condition. For example, because the target of analysis is "Face" under the new analysis processing condition, a higher priority is given to a camera which is capable of capturing video data with an angle of view where a close-up shot of a face is shown, and a higher priority is also given to an analysis engine which executes face analysis processing. Therefore, on the basis of the information shown in FIGS. 4B and 4C, the analysis condition setting device 10 determines that analysis processing by the face analysis unit 41 on video data captured by the camera B has a high priority (HIGH).

However, because the analysis condition setting device 10 has determined that analysis processing by the clothes analysis unit 33 on video data captured by the camera A takes priority under the first analysis processing condition, the analysis condition setting device 10 determines the priority of the clothes analysis processing as "MIDDLE" which is lower than the priority of the face analysis processing described above so that the clothes analysis processing is also continued. Consequently, as shown in FIG. 9A, the order of priority is determined in decreasing order of the face analysis processing on the video data captured by the camera B (HIGH), the clothes analysis processing on the video data captured by the camera A (MIDDLE) and other analysis processing (LOW), and is set in the video analysis device 20.

Further, the priorities of matching data in each analysis processing are also set as in the abovementioned manner (steps S3 and S4 in FIG. 10). Because the analysis processing condition includes "Face Image" as the matching target, the priority of matching processing with information of matching data "Face 1" for that "Face Image" is determined to be "HIGH" and set in the video analysis device 20 as shown in FIG. 9B. Regarding the priorities of matching data at the time of clothes analysis processing set on the basis of the first analysis processing condition, as shown in FIG. 9C, the priority of matching data "Clothes 2" representing "Brown Coat" remains HIGH.

Subsequently, the video analysis device 20 controls the analysis processing operation on the basis of the priority information set in the abovementioned manner (step S5 in FIG. 10). In this case, analysis processing by the face analysis unit 41 corresponding to video data captured by the camera B is executed with the hardware resources of the video analysis device 20 prior to other analysis processing. Then, in a case where a person with a face agreeing with the matching data is detected as a result of face matching, the analysis system executes preset processing, for example, outputs an alert. Although the face analysis processing described above is executed on consecutively inputted video data, clothes analysis processing with the second highest priority set (priority "MIDDLE") is executed in parallel in a case where the hardware resources of the video analysis device 20 are left over while the face analysis processing is being executed. Further, in a case where the hardware resources are still left over, processing with low priority set may be further executed in parallel. However the processing with low priority set does not need to be executed necessarily, and may be discarded.

Thus, in the analysis system in this exemplary embodiment, it is possible to input a new analysis processing condition in accordance with a certain analysis processing result, and therefore, it is possible to quickly acquire a desired analysis processing result which satisfies a more complicated condition. As a result, it is possible to provide a higher-performance analysis system while limiting the hardware resources.

<Supplementary Notes>

Figure 11:
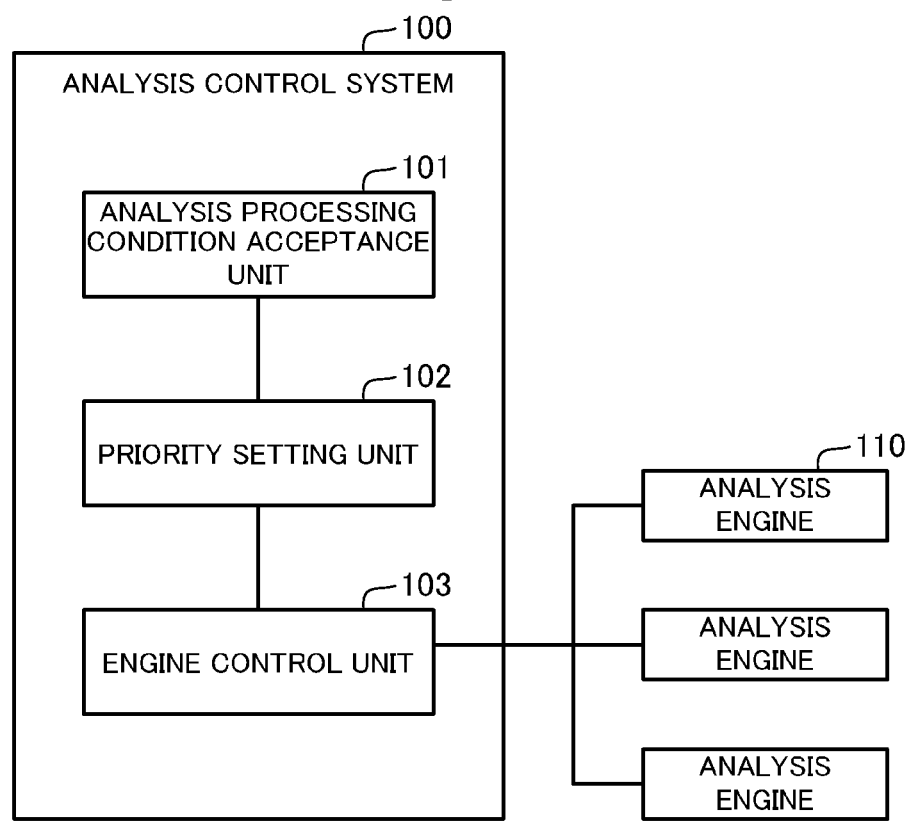
FIG. 11 is a block diagram showing the configuration of an analysis control system in Supplementary Note 1 of the present invention.

The whole or part of the exemplary embodiments disclosed above can be described as the following supplementary notes. The overview of the configurations of an analysis control system (see FIG. 11), a computer program and an analysis control method according to the present invention will be described below. However, the present invention is not limited to the following configurations.

(Supplementary Note 1)

An analysis control system 100 comprising:

an engine control unit 103 controlling analysis processing operation of a plurality of analysis engines 110 each executing analysis processing on analysis target data;

an analysis processing condition acceptance unit 101 accepting input of an analysis processing condition relating to the analysis target data; and a priority setting unit 102 setting a priority of the analysis engine executing the analysis processing on the analysis target data, on a basis of the analysis processing condition, wherein the engine control unit 103 controls the analysis processing operation of the analysis engines in accordance with the priority set by the priority setting unit.

(Supplementary Note 2)

The analysis control system according to Supplementary Note 1, wherein:

the priority setting unit places a higher priority on the analysis engine executing analysis processing enabling acquisition of an analysis result corresponding to the analysis processing condition than on the other analysis engine; and the engine control unit controls so that the analysis processing by the analysis engine with the priority set to a higher value is executed prior to analysis processing by the other analysis engine.

(Supplementary Note 3)

The analysis control system according to Supplementary Note 2, wherein the engine control unit controls so that the analysis processing by at least the one analysis engine with the priority set to the higher value is executed.

(Supplementary Note 4)

The analysis control system according to any one of Supplementary Notes 1 to 3, wherein:

the priority setting unit sets a priority of a data acquisition device acquiring the analysis target data, on the basis of the analysis processing condition; and the engine control unit controls the analysis processing operation of the analysis engines on the analysis target data acquired by the data acquisition device, in accordance with the priority of the analysis engine and the priority of the data acquisition device.

(Supplementary Note 5)

The analysis control system according to Supplementary Note 4, wherein:

the priority setting unit places a higher priority on a data acquisition device acquiring the analysis target data enabling acquisition of an analysis result corresponding to the analysis processing condition than on another data acquisition device; and the engine control unit controls so that the analysis processing by the analysis engine on the analysis target data acquired by the data acquisition device with the priority of the data acquisition device set to a higher value is executed prior to analysis processing on analysis target data acquired by the other data acquisition device.

(Supplementary Note 6)

The analysis control system according to Supplementary Note 5, wherein in a case where the analysis target data is video data and the data acquisition device is a camera capturing the video data, the priority setting unit places a higher priority on the camera set up so as to capture the video data with an angle of view enabling acquisition of an analysis result corresponding to the analysis processing condition than on another camera.

(Supplementary Note 7)

The analysis control system according to Supplementary Note 5 or 6, wherein the priority setting unit places a higher priority on the data acquisition device set up in a position to capture the analysis target data enabling acquisition of an analysis processing result corresponding to the analysis processing condition than on another data acquisition device.

(Supplementary Note 8)

The analysis control system according to any one of Supplementary Notes 1 to 7, wherein the analysis processing condition acceptance unit accepts information based on a result of analysis by the analysis engine as the analysis processing condition.

(Supplementary Note 9)

The analysis control system according to Supplementary Note 8, wherein:

the analysis processing condition acceptance unit accepts information based on a result of analysis by the analysis engine with the priority of the analysis engine set higher as a new analysis processing condition;

the priority setting unit sets a new priority of the analysis engine executing the analysis processing on the analysis target data, on a basis of the new analysis processing condition; and the engine control unit controls the analysis processing operation of the analysis engines in accordance with the new priority set by the priority setting unit.

(Supplementary Note 10)

An information processing device comprising:

an analysis processing condition acceptance unit accepting input of an analysis processing condition relating to analysis target data of analysis by an analysis engine;

a priority determination unit determining a priority of the analysis engine executing analysis processing on the analysis target data, on a basis of the analysis processing condition; and a priority setting unit setting the priority in an analysis processing device so that an engine control unit controls analysis processing operation of a plurality of analysis engines in accordance with the priority, the analysis processing device including the engine control unit controlling the analysis processing operation of the analysis engines.

(Supplementary Note 11)

The information processing device according to Supplementary Note 10, wherein:

the priority determination unit determines to place a higher priority on the analysis engine executing analysis processing enabling acquisition of an analysis result corresponding to the analysis processing condition than on the other analysis engine; and the priority setting unit sets the priority in the analysis processing device so that the engine control unit controls so as to execute the analysis processing by the analysis engine with the priority set to a higher value prior to analysis processing by the other analysis engine.

(Supplementary Note 12)

A computer program comprising instructions for causing an information device to realize:

an analysis processing condition acceptance unit accepting input of an analysis processing condition relating to analysis target data of analysis by an analysis engine;

a priority determination unit determining a priority of the analysis engine executing analysis processing on the analysis target data, on a basis of the analysis processing condition; and a priority setting unit setting the priority in an analysis processing device so that an engine control unit controls analysis processing operation of a plurality of analysis engines in accordance with the priority, the analysis processing device including the engine control unit controlling the analysis processing operation of the analysis engines.

(Supplementary Note 13)

The computer program according to Supplementary Note 12, wherein:

the priority determination unit determines to place a higher priority on the analysis engine executing analysis processing enabling acquisition of an analysis result corresponding to the analysis processing condition than on the other analysis engine; and the priority setting unit sets the priority in the analysis processing device so that the engine control unit controls so as to execute the analysis processing by the analysis engine with the priority set to a higher value prior to analysis processing by the other analysis engine.

(Supplementary Note 14)

An analysis control method comprising:

accepting input of an analysis processing condition relating to analysis target data of analysis by an analysis engine;

setting a priority of the analysis engine executing analysis processing on the analysis target data, on a basis of the analysis processing condition; and controlling analysis processing operation of a plurality of analysis engines in accordance with the priority.

(Supplementary Note 15)

The analysis control method according to Supplementary Note 14 comprising:

placing a higher priority on the analysis engine executing analysis processing enabling acquisition of an analysis result corresponding to the analysis processing condition than on the other analysis engine; and controlling so as to execute the analysis processing by the analysis engine with the priority set to a higher value prior to analysis processing by the other analysis engine.

The abovementioned computer program is stored in a storage device, or recorded on a computer-readable recording medium. For example, the recording medium is a portable medium such as a flexible disk, an optical disk, a magneto-optical disk or a semiconductor memory.

Although the present invention has been described above referring to the exemplary embodiments and so on, the present invention is not limited to the exemplary embodiments described above. The configurations and details of the present invention can be changed and modified in various manners that can be understood by one skilled in the art within the scope of the present invention.

The present invention is based upon and claims the benefit of priority from Japanese patent application No. 2012-269141, filed on Dec. 10, 2012, the disclosure of which is incorporated herein in its entirety by reference.

DESCRIPTION OF REFERENCE NUMERALS 10 analysis condition setting device
11 monitoring condition acceptance unit
12 priority determination unit
13 priority setting unit
14 monitoring condition management unit
15 condition priority judgment unit
16 camera information management unit
17 analysis processing information management unit
18 area estimation unit
20 video analysis device
21 camera A's analysis unit
22 camera B's analysis unit
23 analysis priority management unit
24 analysis execution control unit
31 face analysis unit
32 face BL management unit
33 clothes analysis unit
34 clothes BL management unit
35 behavior analysis unit
41 face analysis unit
42 face BL management unit
43 clothes analysis unit
44 clothes BL management unit
45 behavior analysis unit
100 analysis control system
101 analysis processing condition acceptance unit
102 priority setting unit
103 engine control unit
110 analysis engine

What is claimed is:

1. An analysis control system comprising:
a processor;
an engine control unit, implemented by the processor, that controls analysis processing operation of a plurality of analysis engines, each analysis engine executing analysis processing on analysis target data that is video data captured by a plurality of cameras;
an analysis processing condition acceptance unit, implemented by the processor, that accepts input of an analysis processing condition relating to the video data; and
a priority setting unit, implemented by the processor, that sets a priority of an analysis engine executing the analysis processing on the video data, on a basis of the analysis processing condition,
wherein the priority setting unit places a higher priority on a camera set up so as to capture the video data with an angle of view enabling detection of an object that is the analysis processing condition rather than on another camera, and places a higher priority on the analysis engine executing analysis processing enabling detection of an object that is the analysis processing condition rather than on another analysis engine, and
wherein the engine control unit performs controlling such that the analysis processing by the analysis engine on the video data captured by the camera with the higher priority is executed prior to the analysis processing on the video data acquired by the other camera, and performs controlling such that the analysis processing by the analysis engine with the higher priority is executed prior to the analysis processing by the other analysis engine.

2. The analysis control system according to claim 1, wherein the engine control unit controls the analysis processing by at least the one analysis engine with the priority set to a higher value is executed.

3. The analysis control system according to claim 1, wherein the analysis processing condition acceptance unit accepts information based on a result of analysis by the analysis engine as the analysis processing condition.

4. The analysis control system according to claim 3, wherein:
the analysis processing condition acceptance unit accepts information based on a result of analysis by the analysis engine with the priority of the analysis engine set higher as a new analysis processing condition;

the priority setting unit sets a new priority of the analysis engine executing the analysis processing on the analysis target data, on a basis of the new analysis processing condition; and the engine control unit controls the analysis processing operation of the analysis engines in accordance with the new priority set by the priority setting unit.

5. An information processing device comprising:

a processor;

an analysis processing condition acceptance unit, implemented by the processor, that accepts input of an analysis processing condition relating to analysis target data of analysis by an analysis engine, wherein the analysis target data is video data captured by a plurality of cameras;

a priority determination unit, implemented by the processor, that determines a priority of the analysis engine executing analysis processing on the video data, on a basis of the analysis processing condition; and a priority setting unit, implemented by the processor, that sets the priority in an analysis processing device so that an engine control unit controls analysis processing operation of a plurality of analysis engines in accordance with the priority, the analysis processing device including the engine control unit controlling the analysis processing operation of the analysis engines, wherein the priority determination unit places a higher priority on a camera set up so as to capture the video data with an angle of view enabling detection of an object that is the analysis processing condition rather than on another camera, and places a higher priority on the analysis engine executing analysis processing enabling detection of an object that is the analysis processing condition rather than on another analysis engine; and wherein the priority setting unit sets the priority in the analysis processing device so that the engine control unit performs controlling such that the analysis processing by the analysis engine on the video data captured by the camera with the higher priority is executed prior to the analysis processing on the video data acquired by the other camera, and performs controlling such that the analysis processing by the analysis engine with the higher priority is executed prior to the analysis processing by the other analysis engine.

6. A non-transitory computer-readable medium storing a program comprising instructions for causing a computer to execute:

an analysis processing condition acceptance unit that accepts input of an analysis processing condition relating to analysis target data of analysis by an analysis engine, wherein the analysis target data is video data captured by a plurality of cameras;

a priority determination unit that determines a priority of the analysis engine executing analysis processing on the video data, on a basis of the analysis processing condition; and a priority setting unit that sets the priority in an analysis processing device so that an engine control unit controls analysis processing operation of a plurality of analysis engines in accordance with the priority, the analysis processing device including the engine control unit controlling the analysis processing operation of the analysis engines, wherein the priority determination unit places a higher priority on a camera set up so as to capture the video data with an angle of view enabling detection of an object that is the analysis processing condition rather than on another camera, and places a higher priority on the analysis engine executing analysis processing enabling detection of an object that is the analysis processing condition rather than on another analysis engine; and wherein the priority setting unit sets the priority in the analysis processing device so that the engine control unit performs controlling such that the analysis processing by the analysis engine on the video data captured by the camera with the higher priority is executed prior to the analysis processing on the video data acquired by the other camera, and performs controlling such that the analysis processing by the analysis engine with the higher priority is executed prior to the analysis processing by the other analysis engine.

7. An analysis control method comprising:

accepting input of an analysis processing condition relating to analysis target data of analysis by an analysis engine, wherein the analysis target data is video data captured by a plurality of cameras;

setting a priority of the analysis engine executing analysis processing on the video data, on a basis of the analysis processing condition; and controlling analysis processing operation of a plurality of analysis engines in accordance with the priority;

placing a higher priority on a camera set up so as to capture the video data with an angle of view enabling detection of an object that is the analysis processing condition rather than on another camera, and placing a higher priority on the analysis engine executing analysis processing enabling detection of an object that is the analysis processing condition rather than on another analysis engine; and controlling such that the analysis processing by the analysis engine on the video data captured by the camera with the higher priority is executed prior to the analysis processing on the video data acquired by the other camera, and controlling such that the analysis processing by the analysis engine with the higher priority is executed prior to the analysis processing by the other analysis engine.

* * * * *